(12) United States Patent
Brederson et al.

(10) Patent No.: US 8,855,191 B2
(45) Date of Patent: Oct. 7, 2014

(54) PARALLELIZATION OF HIGH-PERFORMANCE VIDEO ENCODING ON A SINGLE-CHIP MULTIPROCESSOR

(75) Inventors: J. Dean Brederson, Salt Lake City, UT (US); Greg Gillis, Riverton, UT (US); Sean Heffernan, Salt Lake City, UT (US); Daichi Furusaka, Tokyo (JP); Keishi Chikamura, Tokyo (JP); Masato Hori, Tokyo (JP); Di Wu, Lund (SE); Lim Boon Shyang, Johor (MY)

(73) Assignee: Broadcast International, Inc., Salt Lake City, UT (US)

( * ) Notice: Subject to any disclaimer, the term of this patent is extended or adjusted under 35 U.S.C. 154(b) by 524 days.

(21) Appl. No.: 12/625,484

(22) Filed: Nov. 24, 2009

(65) Prior Publication Data

US 2010/0246665 A1    Sep. 30, 2010

Related U.S. Application Data

(60) Provisional application No. 61/117,530, filed on Nov. 24, 2008.

(51) Int. Cl.
| | |
|---|---|
| *H04N 7/12* | (2006.01) |
| *H04N 19/61* | (2014.01) |
| *H04N 19/433* | (2014.01) |
| *H04N 19/436* | (2014.01) |
| *H04N 19/174* | (2014.01) |
| *H04N 19/423* | (2014.01) |

(52) U.S. Cl.
CPC ... *H04N 19/00515* (2013.01); *H04N 19/00781* (2013.01); *H04N 19/00521* (2013.01); *H04N 19/00272* (2013.01); *H04N 19/00484* (2013.01)
USPC .................................................. 375/240.01

(58) Field of Classification Search
USPC ..................................................... 375/240.01
IPC ........................................................ H04N 7/12
See application file for complete search history.

(56) References Cited

U.S. PATENT DOCUMENTS

| | | | | |
|---|---|---|---|---|
| 5,862,262 | A * | 1/1999 | Jacobs et al. .................. | 382/249 |
| 8,416,857 | B2 * | 4/2013 | Au et al. .................. | 375/240.24 |
| 2006/0008007 | A1 * | 1/2006 | Olivier et al. ............ | 375/240.16 |
| 2006/0072662 | A1 * | 4/2006 | Tourapis et al. ......... | 375/240.12 |
| 2007/0253491 | A1 * | 11/2007 | Ito et al. .................... | 375/240.24 |
| 2007/0265016 | A1 * | 11/2007 | Kahtava et al. ............ | 455/452.2 |
| 2008/0120676 | A1 * | 5/2008 | Morad et al. .................. | 725/127 |
| 2008/0250227 | A1 * | 10/2008 | Linderman et al. ............. | 712/32 |
| 2009/0003447 | A1 * | 1/2009 | Christoffersen et al. | 375/240.16 |

* cited by examiner

*Primary Examiner* — Dave Czekaj
*Assistant Examiner* — Tracy Li
(74) *Attorney, Agent, or Firm* — Kory D. Christensen; Stoel Rives LLP

(57) ABSTRACT

High-quality video encoding may be implemented using a single-chip multiprocessor system. Video encoding may be parallelized to take advantage of multiple processing elements available on a single-chip multiprocessor system. Task level parallelism may comprise parallelizing encoding tasks, such as motion estimation, compensation, transformation, quantization, deblocking filtering, and the like across multiple processing elements. Data level parallelism may comprise segmenting video frame data into macroblock partitions and slabs adapted to provide data independence between parallel processing elements. Data communications and synchronization features of the single-chip system may be leveraged to provide for data sharing and synchronism between processing elements.

15 Claims, 14 Drawing Sheets

PARALLELIZATION OF HIGH-PERFORMANCE VIDEO ENCODING ON A SINGLE-CHIP MULTIPROCESSOR

CROSS-REFERENCE TO RELATED APPLICATIONS

This application claims the benefit of U.S. Provisional Application No. 61/117,530, filed on Nov. 24, 2008, and entitled, "Parallelization of High-Performance Video Encoding on a Single-Chip Multiprocessor," which is hereby incorporated by reference in its entirety.

TECHNICAL FIELD

This disclosure relates to video encoding and, in particular, to high-performance video encoding on single-chip multiprocessors.

BRIEF DESCRIPTION OF THE DRAWINGS

Additional aspects and advantages will be apparent from the following detailed description of preferred embodiments, which proceeds with reference to the accompanying drawings.

DETAILED DESCRIPTION OF PREFERRED EMBODIMENTS

A video encoding task may be implemented on a single-chip multiprocessor using multi-level parallelization, which may provide for high-resolution video encoding (e.g., 1080p, 1920×1080, etc.), in real-time (30 frames-per-second).

In some embodiments, a single-chip multiprocessor may comprise one or more general purpose processing elements (GPEs) and/or one or more processing elements (PEs). One example of such a multiprocessor is the STI (Sony, Toshiba, IBM) CELL processor ("STI CELL processor" hereafter). Other examples include Intel Core 2 Duo®, Core i5® and i7® processors, multicore processors from AMD, such as the Athlon® and Phenom®, processors, and the like. In the STI Cell example, a single-chip multiprocessor may include a GPE (a general purpose PowerPC processor element) and a plurality of PEs (Synergiztic Processing Elements). An STI CELL processor may comprise one GPE and six to eight PEs. In other examples, a processing element may include a plurality of general purpose processing elements (e.g., cores), each of which may include various processing elements (floating point processing elements, integer elements, and the like).

A typical video encoding implementation may read video data in a "frame loop," in which successive video frames are read, encoded using a particular codec (e.g., H.264/AVC), and written out in the encoded format. The encoding tasks that may have been performed in serial, may be mapped onto single-chip multiprocessor elements to increase encoder performance. The mapping may include segmenting an encoding processing tasks and/or data to provide for parallelization across multiple processing elements (GPE(s) and/or PE(s)) available on a single-chip multiprocessor.

Figure 1A:
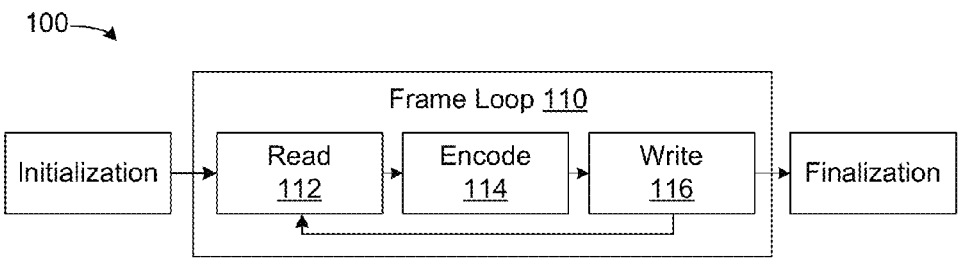
FIG. 1A is a data flow diagram of video encoding.
Figure 1B:
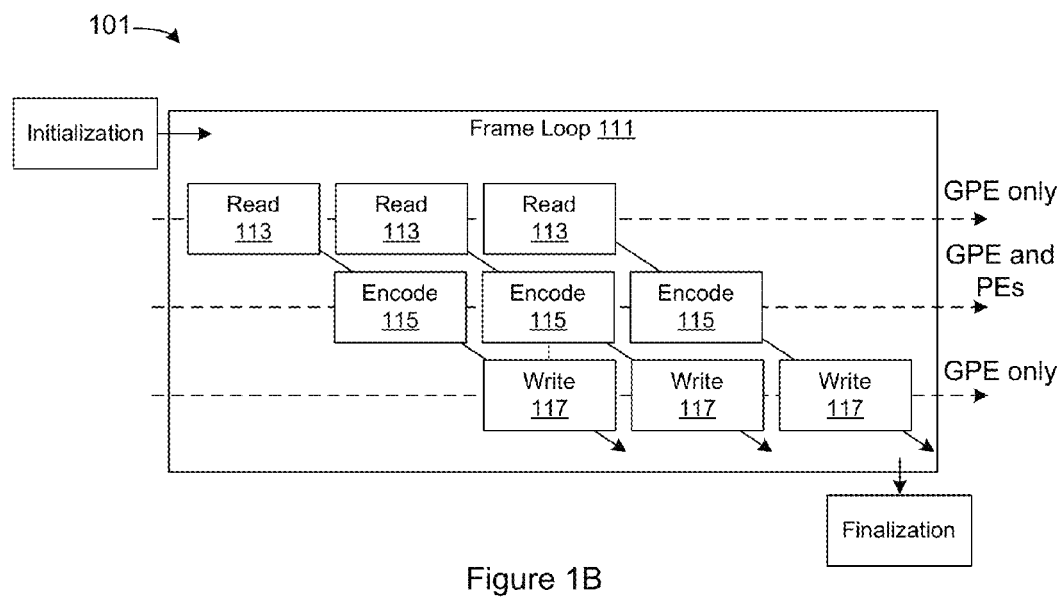
FIG. 1B is a data flow diagram of parallelized video encoding.

FIG. 1A, shows one example of a video encoding data flow 100 in which each frame of a video is read 112, encoded 114 (into a particular video codec), and written 116 (in the codec) within a frame loop 110. In the data flow 101 depicted in FIG. 1B, the frame loop 111 may be parallelized using the capabilities of a single-chip multiprocessor. As shown in FIG. 1B, read 113, encode 115, and write 117 processing may be pipelined within the GPE and PEs available on the single-chip multiprocessor. The pipelining may address input/output latency and provide for increased throughput.

The encoding (performed at processing step 115) may include per-frame and per-macroblock processing operations. The per-frame operations may include, but are not limited to: pre-processing, post-processing, deblocking filtering, entropy coding, and the like. The per-macroblock operations may include, but are not limited to: motion estimation, motion compensation, transform operations (discrete cosine transform (DCT), inverse DCT, etc.), quantization (quantization/de-quantization), and the like. The encoding operations may be further parallelized using processing resources available on the single-chip multiprocessor. For example, a GPE may be used to perform pre- and post-processing tasks, whereas one or more PEs may be used to perform encoding tasks (e.g., chroma permutation, motion estimation, motion compensation, transform (discrete cosine transform), quantization, inverse DCT, deblocking filtering, and entropy coding).

Figure 2:
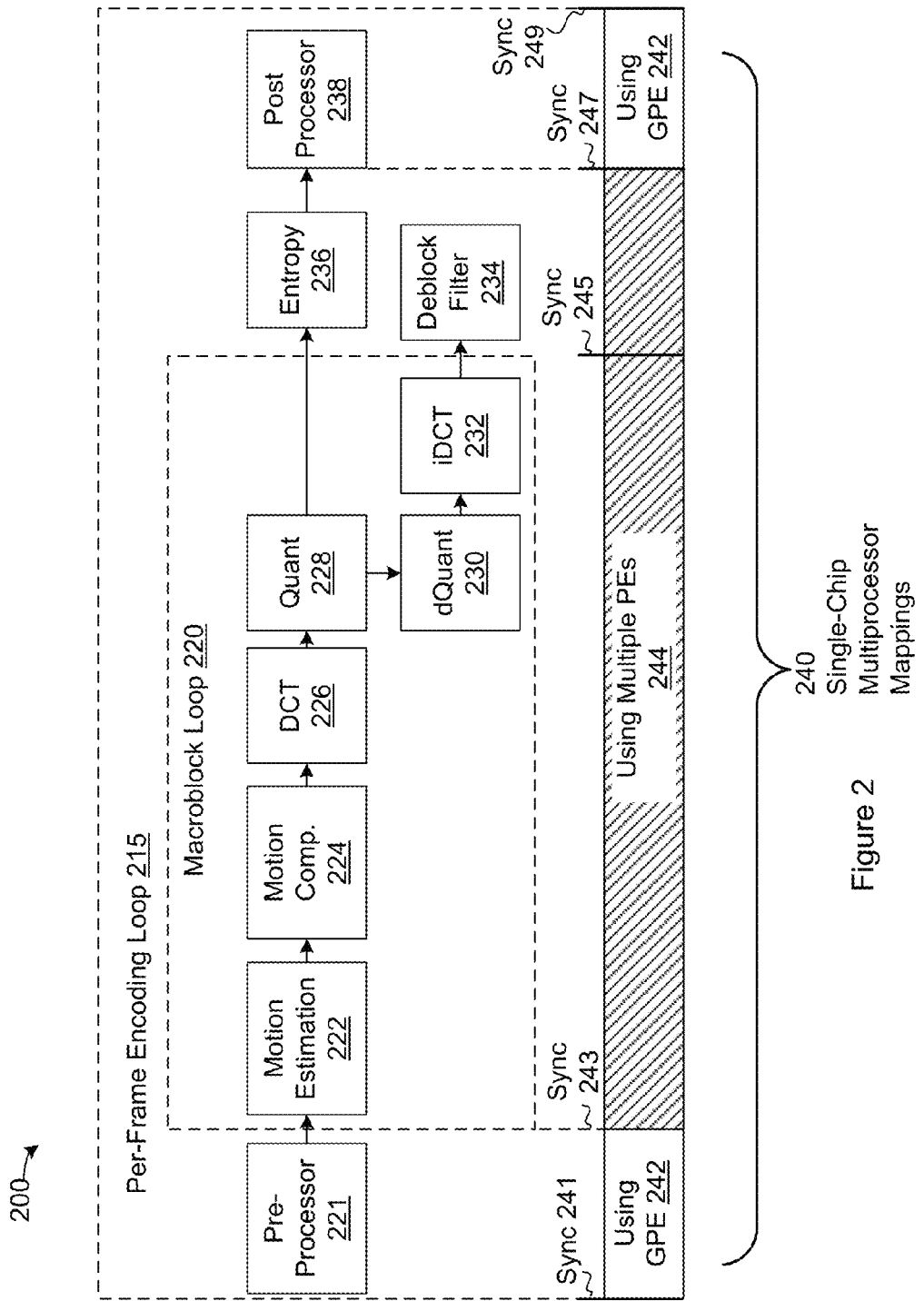
FIG. 2 is a data flow diagram of parallelized frame encoding.

FIG. 2 shows a data flow diagram of one example of encoding parallelization using a single-chip multiprocessor. The operations shown in FIG. 2 may include per-frame operations 215 performed during frame encoding (e.g., encoding 114 and/or 115 of FIGS. 1A and/or 1B). The per-frame operations may include pre-processing 221, deblocking filtering and/or reconstruction 234, entropy coding 236, and post-processing 238. Frame encoding 215 may include a plurality of macroblock operations performed within a macroblock loop 220. The macroblock loop 220 may include motion estimation 222, motion compensation 224, transform (a discrete cosine transform (DCT)) 226, quantization 228, de-quantization 230, and inverse transform (inverse DCT) 232.

As discussed above, some of the operations may be performed using a GPE of a single-chip multiprocessor, whereas other operations may be parallelized using the PEs of the single-chip multiprocessor. The single-chip multiprocessor mapping 240 shows which encoding operations may be performed on which processing elements. As shown in region 242, the pre-processing step 221 and the post-processing step 238 may be performed using the single-chip multiprocessor GPE. Region 244 indicates that the macroblock operations 222, 224, 226, 228, 230, and 232 as well as the per-frame operations 234 and/or 236 may be implemented on one or more PEs of the single-chip multiprocessor. The synchronization points 241, 243, 245, 247, and 249 indicate when processing is to be synchronized across the different processing elements of the single-chip multiprocessor. The individual operations 222, 224, 226, 228, 230, 232, 234, and 236 may be processed in a pipelined fashion (e.g., on multiple PEs).

In some embodiments, and as discussed below, the encoding tasks 222, 224, 226, 228, 230, and 232 may be implemented using different processing elements (PEs) of a single-chip multiprocessor. A GPE of the multiprocessor may be used to coordinate the operation of the individual PEs, control data flow to/from the PEs, and the like. For example, different portions of a frame (macroblock partitions, discussed below) may be processed by different PEs. A GPE may loop across the available PEs to assign motion estimation (and other macroblock processing) tasks of a particular macroblock partition thereto. The assignment of macroblock partitions to PEs may be adapted to resolve dependencies between adjacent partitions (examples of such dependencies are described below).

In some embodiments, the GPE may perform a round-robin assignment of processing tasks to PEs. The GPE may control access to shared memory resources. When a PE is assigned a particular processing task, the GPE may "free" the shared memory location corresponding to the task and/or may communicate the data required for processing to the PE (e.g., using a DMA, channel, or processor-specific mailbox (discussed below)). Following the macroblock processing (using elements 222, 224, 226, 228, 230, and/or 232), the GPE may synchronize the data across the PEs (e.g., using a mailbox communications mechanism, or other PE communications system, such as a crossbar, DMA, or the like).

Some operations may be adapted for parallelization at a data level. For example, motion estimation (operation 222) may include macroblock dependencies (discussed below). The data format and partitioning implemented by the video encoding system of this disclosure may be configured to maximize parallelization the processing tasks associated therewith.

Figure 3A:
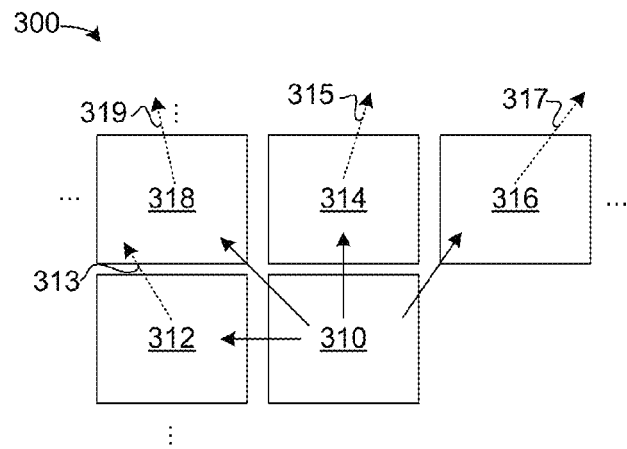
FIG. 3A depicts macroblock motion estimation dependencies.

FIG. 3A depicts a set of macroblocks 300, each of which may be processed to calculate a motion estimate. As shown in FIG. 3A, the motion estimate of macroblock 310 may depend upon the motion estimates 313, 315, 317, and 319 of the surrounding macroblocks 312, 314, 316, and 318. Accordingly, the motion estimates 313, 315, 317, and 319 may need to be calculated before the motion estimate 311. Moreover, the motion estimates 313, 315, 317, 319 may have similar dependencies on other, surrounding macroblocks (e.g., the motion estimate 315 of macroblock 314 may be dependent upon, inter alia, the motion estimate 319 of macroblock 318, and so on). Therefore, the parallelization of motion estimation may require splitting of a frame into macroblock partitions and/or slabs adapted to minimize for inter-macroblock dependencies. Moreover, the parallelization may require data sharing to provide the motion estimates of 313, 315, 317, and/or 319 to the PE calculating the motion estimate of macroblock 310.

Figure 3B:
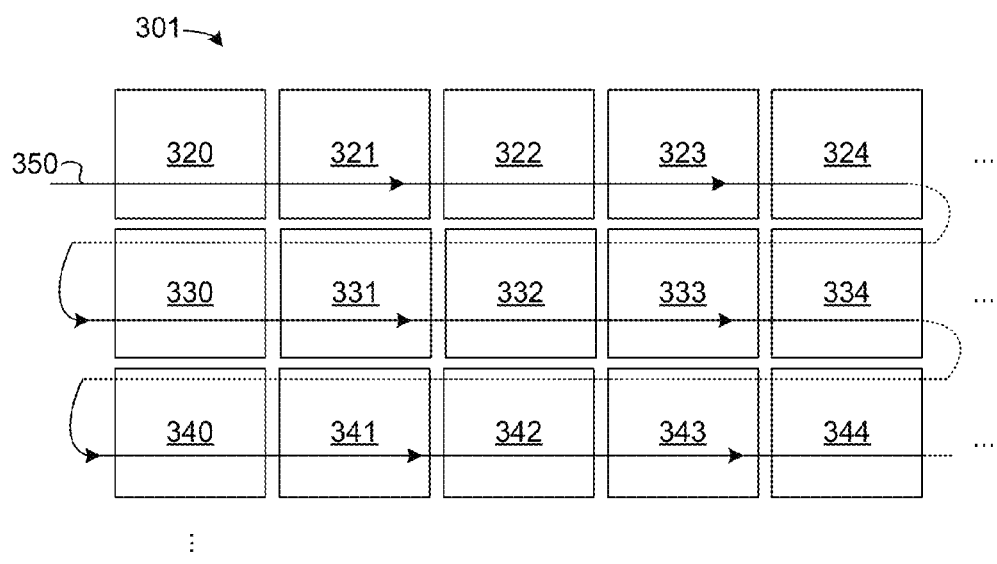
FIG. 3B depicts a processing scheme for macroblock motion estimation.

In one example, motion estimation (and other encoding tasks) may be performed sequentially. Referring to FIG. 3B, a set of macroblocks 301 may be encoded by processing each macroblock in "scanline" order (e.g., starting with macroblock 320, then to 321, 322, 323, 324, 330, and so on). The traversal line 350 shows an example of this sequential processing (e.g., single threaded processing). The ordering of processing depicted by traversal line 350 may be enforced on a PE of a single-chip multiprocessor using various synchronization means (e.g., locking buffers until prerequisite processing has taken place, providing a processing queue, or the like).

Figure 3C:
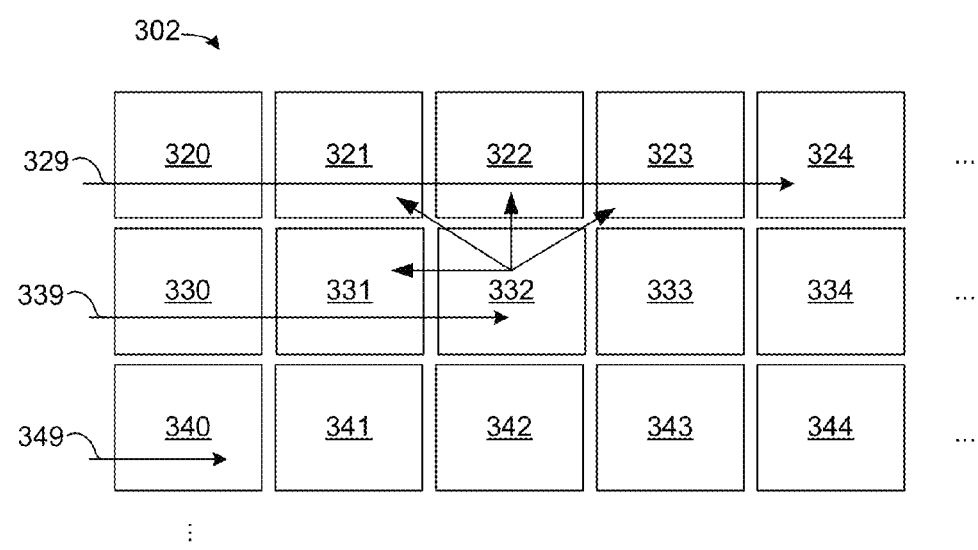
FIG. 3C depicts another processing scheme for macroblock motion estimation.

For multi-threaded processing, the macroblocks may be processed in a staggered fashion. Referring to FIG. 3C, motion estimates of a set of macroblocks 302 may be calculated using a multi-threaded processing scheme. The processing thread 329 may begin sequentially processing the first row of macroblocks (macroblocks 320, 321, 322, and so on). After the motion estimation of macroblock 321 is calculated, the processing thread 339 may begin processing the second row of macroblocks (macroblocks 330, 331, 332, and so on). The multi-threaded processing may continue in a similar manner through the remaining rows of macroblocks (e.g., processing thread 349 may begin processing 340 upon the calculation of the motion estimate of macroblock 341, and so on). Accordingly, as the multiple processing threads traverse the macroblocks 302, the motion vector dependencies of each of the macroblocks 302 may be satisfied. For instance, when processing thread 339 calculates the motion estimate for macroblock 332, the motion estimates for blocks 322, 323, and 331 will already have been calculated. Data parallelization between the PEs may allow the motion estimates of the macroblocks 321, 322, 323, and 331 to be available to the PE calculating the motion estimate of macroblock 332. If the multiple threads are implemented using respective PEs of a single-chip multiprocessor, a similar scheduling scheme may be implemented (e.g., one or more of the processing threads 329, 339, 349, and/or 359 may be implemented on different PEs, each of which may calculate motion vectors as described above).

Figure 4A:
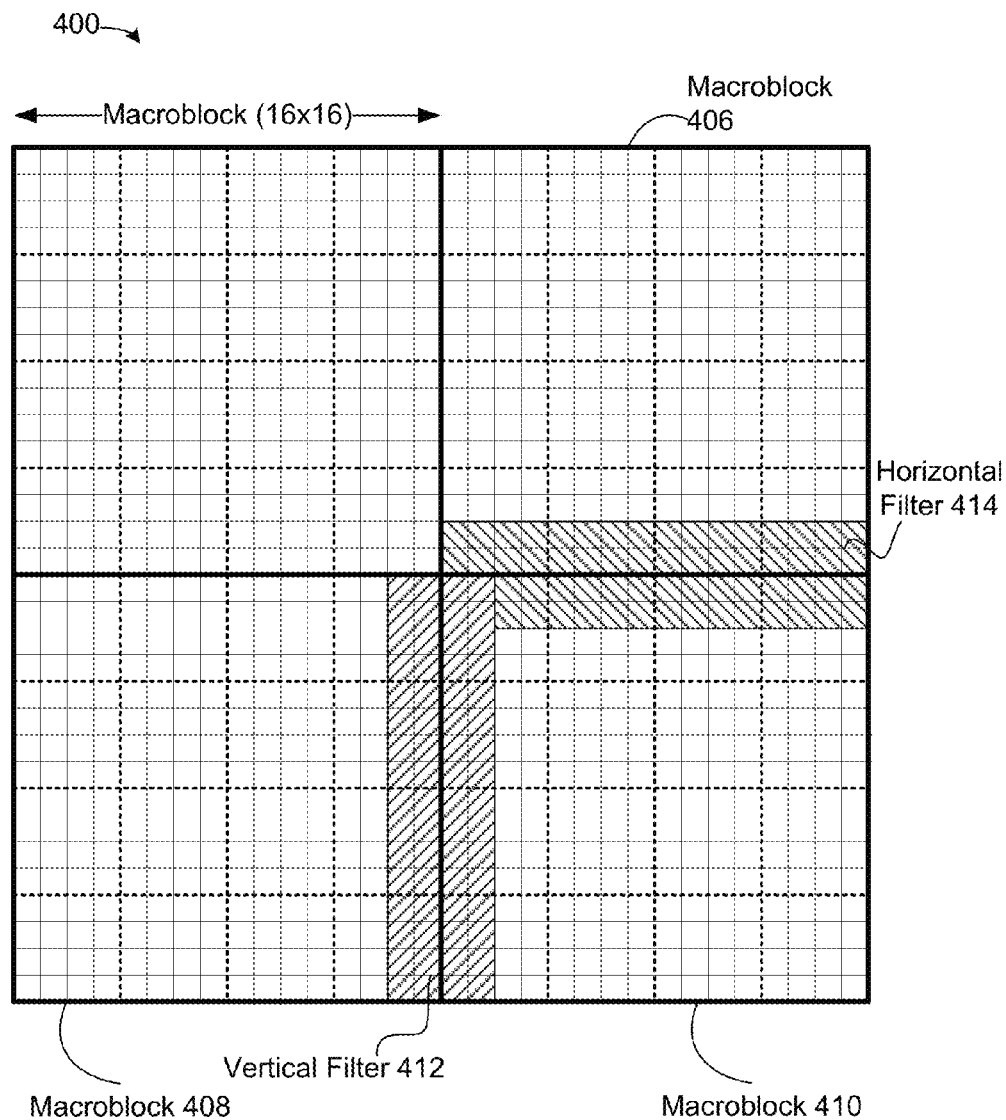
FIG. 4A depicts a macroblock deblocking filtering.

Filtering (such as the deblocking filtering and/or reconstruction at 234 in FIG. 2) may have similar macroblock dependencies. FIG. 4A shows one example of a 4×4 deblocking filter operation 400 within a macroblock 410. The deblocking filter may operate on 4×4 block boundaries and may include four horizontal filters (one for each 4×4 block boundary within the macroblock 410) and four vertical filters. The FIG. 4A example shows one of the four vertical filters 412 and one of the four horizontal filters 414. As shown in FIG. 4A, the vertical filter 412 includes portions of neighboring macroblock 408, and the horizontal filter 414 includes portions of neighboring macroblock 406. Accordingly, the 4×4 filter operation on macroblock 410 is dependent on both macroblocks 406 and 408.

The deblocking filtering may performed similarly to the encoding processing described above. In a single threaded processing example, filtering may occur sequentially in scan-line order (e.g., as shown in FIG. 3B), and in a multi-threaded processing example, filtering may occur using staggered, row-wise processing as shown in FIG. 4B.

Figure 4B:
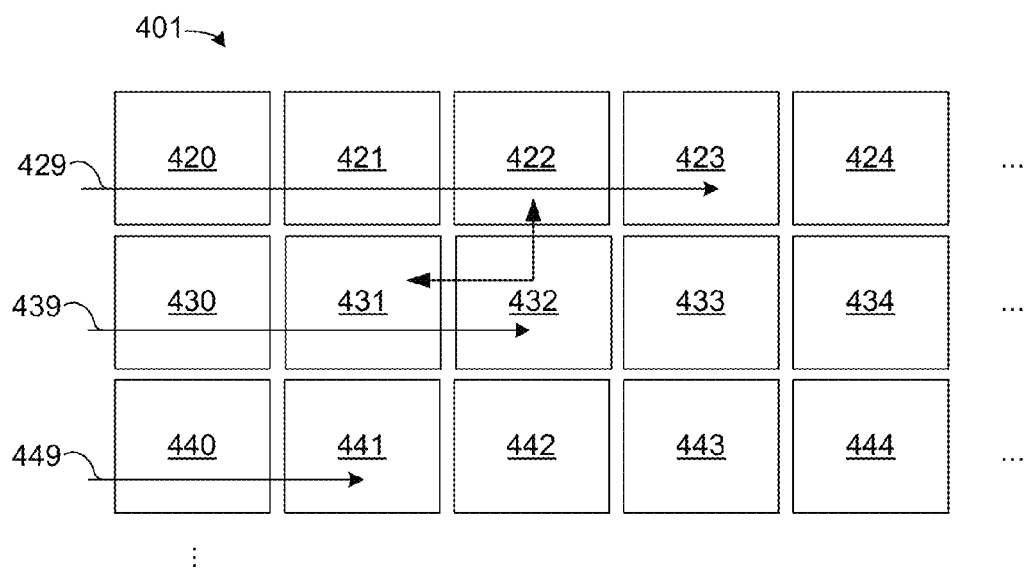
FIG. 4B depicts a processing scheme for macroblock deblocking filtering.

Referring to FIG. 4B, the 4×4 block boundary filtering described above may be implemented using multiple processing threads and/or using multiple PEs of a single-chip multiprocessor. The processing performed by the threads (or processors) 429, 439, and 449 may be staggered such that when a particular macroblock (e.g., macroblock 432) is to be filtered, the macroblocks 401 upon which the particular macroblock depends (e.g., macroblocks 422 and 431) will have been processed (e.g., motion compensation, transform, quantization, de-quantization, inverse transform, and the like). Therefore, as shown in FIG. 4B, the processing thread 429 may begin processing at macroblock 420 and, after 420 has been processed, the thread 439 may begin processing macroblock 430, and, when 430 is processed, thread 449 may begin processing macroblock 440, and so on.

As discussed above, a single-chip multiprocessor may comprise multiple processing elements (one or more GPEs and/or PEs). The video encoding processing described above (motion estimation, filtering, etc.) may be spread across the processing resources available on the multiprocessor. For instance, delegation and/or pre- and post-processing may be performed on the GPE(s), whereas motion estimation, motion compensation, DCT, iDCT, quantization, de-quantization, filtering, entropy encoding, and the like may be implemented on the PEs. Alternatively, in other multiprocessor architectures, general purpose core elements may perform pre- and/or post-processing, whereas other processing elements (e.g., floating point units, integer units, etc.), may perform encoding processing tasks.

The encoding processing tasks may be spread across multiple PEs and/or other processing elements. Processing tasks parallelized on a task and/or data basis. For example, video data may be partitioned into portions that may be processed by different processing elements. The partitioning may be adapted to minimize inter-PE communications (e.g., reduce inter-PE dependencies). For example, the task and/or data partitioning may be adapted to distribute encoding tasks across multiple PEs according to processing dependencies within the data, such as the motion estimation dependences discussed above in conjunction with FIGS. 3A-3C and/or the filtering dependencies of FIGS. 4A-4B.

In some embodiments, a video frame (comprising a plurality of macroblocks) may be segmented into a set of partitions. Each of the partitions may be statically assigned to a different PE for processing. As discussed above, the partitions may be adapted to reduce inter-PE dependencies.

Figure 5:
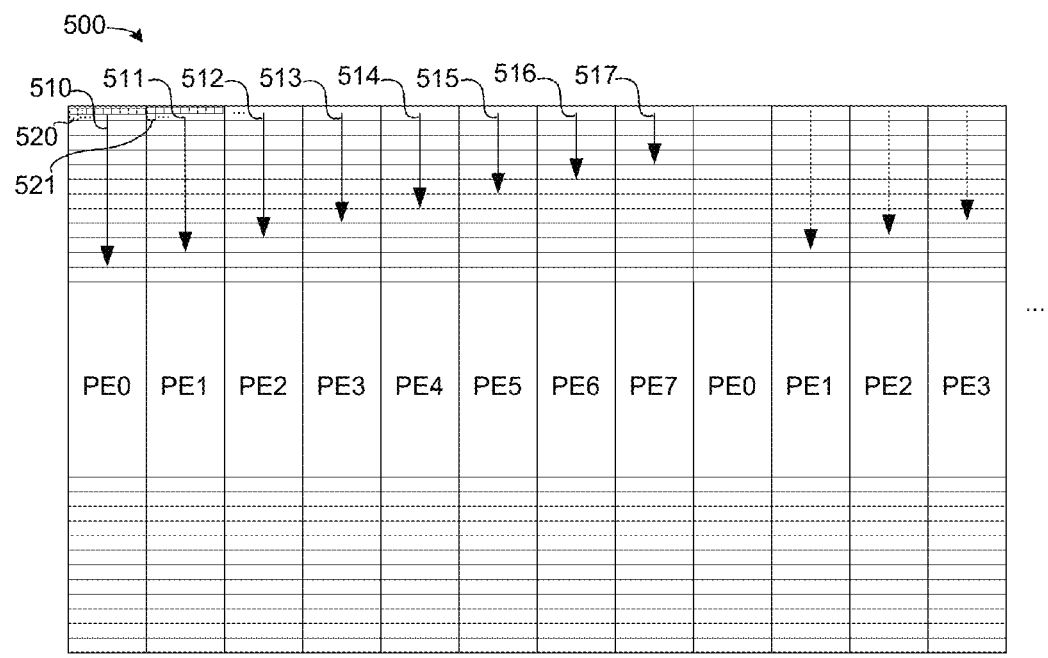
FIG. 5 shows one example of multiple processing elements encoding a vertically partitioned set of macroblocks.

FIG. 5 illustrates a static assignment 500 of processing tasks to each of eight PEs (PE0 through PE7). Although a set of eight PEs is shown in FIG. 5, the disclosure is not limited in this regard; the teachings of the disclosure could be applied to single-chip multiprocessors comprising any number of PEs and/or GPEs. The PEs may each perform a set of processing tasks, which are illustrated in FIG. 5 by respective processing indicators 510, 511, 512, 513, 514, 515, 516, and 517. Each PE may process a respective set of macroblocks 520 (macroblock slab 520). The order of the processing 510, 511, 512, 513, 514, 515, 516, and 517 may be staggered, such that dependencies between different sets of macroblocks (e.g., 520 and 521) may be maintained. The relative ordering may be enforced by a GPE (or other PE), which may implement a synchronization scheme, processing queue, or the like.

In one example, in which high-definition video is encoded (e.g., 1080p or 1088p) a frame may be divided into 5 vertical partitions each of 24 macroblocks wide and 68 macroblocks tall. The macroblocks may be further partitioned into macroblock slabs that are 24 macroblocks wide and 2 macroblocks tall (referred to as macroblock slabs), for a total of 170 slabs. The macroblock slab sizes may be selected to provide for high-efficiency data transfers (e.g., the width of partition to be 24 is that this makes the partition size is divisible by 128, which corresponds to the DMA alignment of many single-chip multiprocessors). Six PEs may be used to encode the 170 slabs in a round-robin manner (e.g., perform motion estimation, motion compensation, transform, quantization, de-quantization, inverse transform, and reconstruction/de-blocking filtering).

Each SPU may be primed or assigned to process two macroblock slabs at a time. Processing in this manner may hide the DMA of the next macroblock slab and the DMA of the finished macroblock back to main memory behind the current slab's processing.

Data for processing may be routed to the PEs using mailbox communication (communication provided by the single-chip multiprocessor), or other communications means. If mailbox communication is used (e.g., video encoding is performed using a STI CELL), by the time an PE has finished processing, its mailbox will have already been notified of the next macroblock slab to process, and will have already started performing the DMA, and hence the video data may be double buffered. Once this new macroblock slab number is read from the mailbox, another number will be popped onto that mailbox by the GPE.

Figure 6:
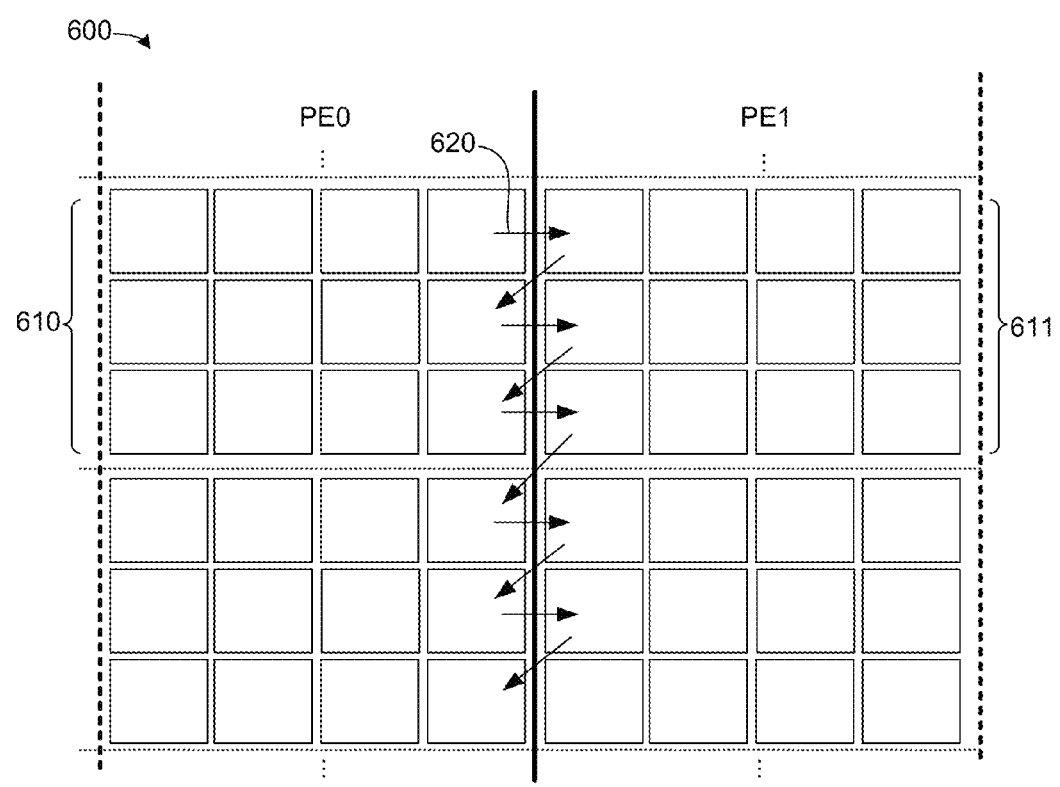
FIG. 6 illustrates motion estimation dependencies between boundary macroblocks.

In one embodiment, a frame may be vertically segmented into a set of macroblock slices. Each macroblock slice may be processed by a respective PE. FIG. 6 illustrates an exemplary set of vertically partitioned macroblocks 600 being processed by two different PEs (PE0 and PE1). For illustrative purposes, the vertical partitions are shown as macroblock "slabs," 610 and 611, wherein each slab 610 and 611 comprises a 4×3 set of macroblocks. As shown by the motion estimation dependencies 620, the processing may include the PE0 and PE1 communicating motion estimation information therebetween.

Figure 7:
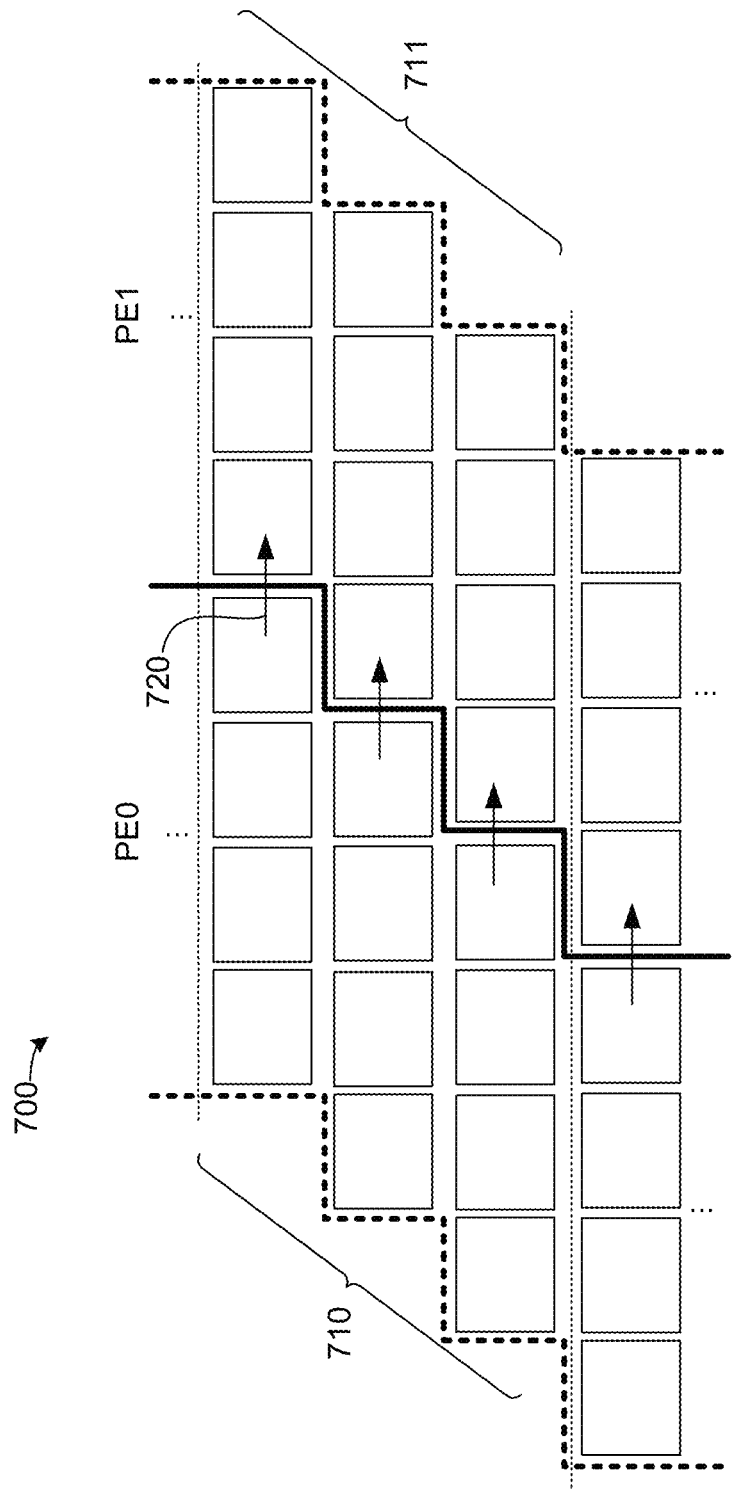
FIG. 7 depicts one example of diagonal macroblock partitioning.

In another example, the macroblocks within a frame may be diagonally partitioned. Diagonal partitioning may decrease the macroblock dependencies between PEs (e.g., motion estimation and/or deblocking filtering dependencies). FIG. 7 shows an example of diagonally partitioned macroblocks 700 being processed by two different PEs (PE0 and PE1). As shown in FIG. 7, the slabs 710 and 711 being processed by the PEs PE0 and PE1 may correspond to diagonal partitions of a frame. Accordingly, the motion estimation information dependencies 720 between the PE0 and PE1 are reduced (e.g., a one-way dependency from PE0 to PE1 as opposed to a bi-directional flow of information between PE0 and PE1 as in FIG. 6).

Figure 8:
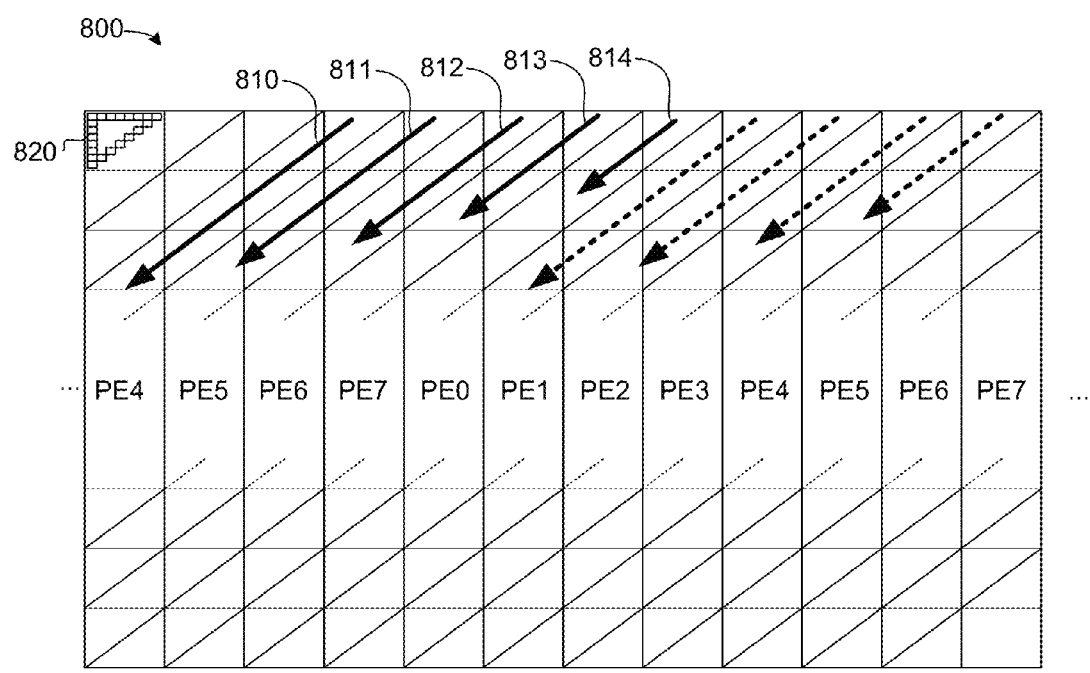
FIG. 8 shows one example of multiple processing elements encoding a diagonally partitioned set of macroblocks.

FIG. 8 shows an example of a static assignment of macroblock encoding tasks 800 spanning eight PEs, in which the frame is partitioned diagonally. Each one of the eight PEs (PE0 through PE8) may process a portion of a diagonal slice 820 of the macroblocks comprising a frame. As shown by the processing indicators 810, 811, 812, 813, and 814, the processing of the diagonal slices may be performed in a staggered order to account for dependencies (e.g., motion estimation) between adjacent diagonal macroblock slices (e.g., the dependencies 720 shown in FIG. 7). As shown in FIG. 8, the diagonal partitioning and static assignment to the eight PEs may allow for high PE utilization (100% after the pipeline is filled) and efficient PE to PE data transfer.

In some embodiments, the PEs may communicate using a direct memory access (DMA) transfer. The DMA transfer implemented by a video encoding system that may be adapted to the capabilities of a particular single-chip multiprocessor. For example, a STI CELL processor (and other single-chip multiprocessors) may provide for DMA transfers on a cache line. Transfers comprising 128-byte aligned data may be more efficient than transfers of other data sizes and/or alignments. Accordingly, data transfers may be configured to comprise 128-byte aligned data (e.g., although data need not be 128-byte aligned, the lower seven bits may be configured to match to have the same offset from a 128-byte boundary). In embodiments incorporating other single-chip multiprocessor architectures, different data transfer adaptations may be made. In addition to data transfers, the layout of macroblocks on memory may be adapted according to the single-chip architecture used to video encoding. In the STI CELL example, macroblock slab height (4×3, or other sizes) may be adapted to maximize local store utilization (e.g., partition size may be eight macroblocks in width and one macroblock high with DMA double buffering).

The encoding tasks discussed above may comprise three major pipeline stages for PE tasks. A first stage may comprise macroblock encoding, the macroblock encoding pipeline stage may include motion estimation, motion compensation, transform (DCT, iDCT), quantization, and the like (tasks 222, 224, 226, 228, 239, and 232 of FIG. 2). A maximal number of PEs may be utilized to implement the first pipeline stage. Examples of data flows in which eight out of eight PEs of a single-chip multiprocessor are utilized to perform first pipeline stage processing are described above in conjunction with FIGS. 5-8. A second pipeline stage may comprise deblocking filtering. Deblocking filtering may be adapted to utilize a maximal number of PEs used for processing. Examples of data flows to maximize filtering processing throughout, while minimizing inter-PE communication and dependencies, are described above in conjunction with FIGS. 4A 4B, and 5-8. The third pipeline stage may include entropy encoding (e.g., context-adaptive binary arithmetic coding (CABAC)) and may be implemented using a single PE.

In some embodiments, the pipeline states may be statically assigned to the processing resources of the single-chip multiprocessor (e.g., each PE may be assigned a particular portion of the processing tasks described above). Some examples of static PE assignments are provided above in conjunction with FIGS. 5-8 (e.g., each PE being assigned a partition of macroblocks of a frame).

Figure 9:
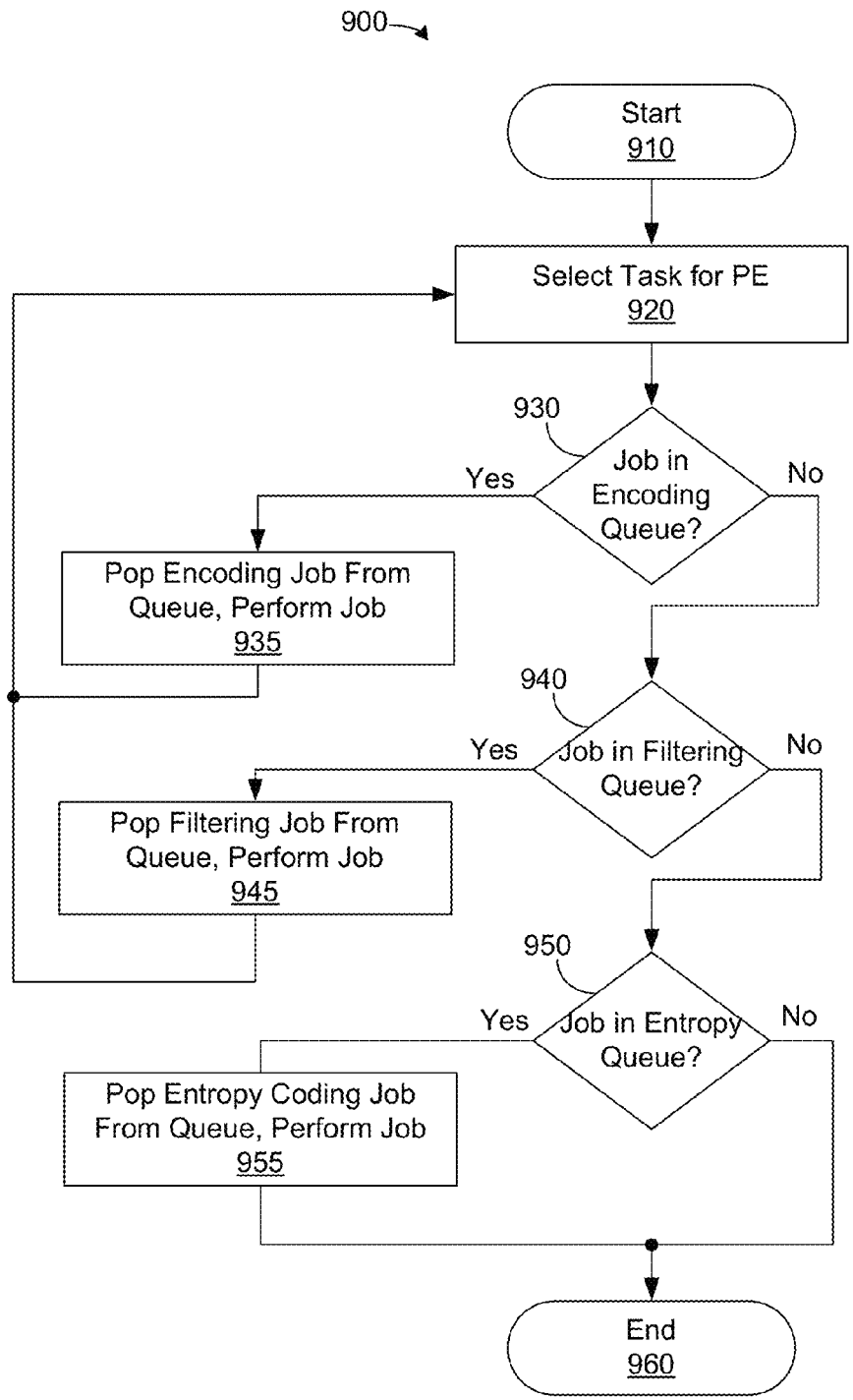
FIG. 9 is a flow diagram of a method for selecting a processing task.

Alternatively, or in addition, one or more PEs may be dynamically assigned to particular tasks. In some embodiments, no static assignments may be used, and PEs may choose and/or be assigned tasks using a scheduling algorithm (e.g., according to dataflow, dependencies, computational volume, and other factors). For example, a PE may select a task according to one or more rules. The rules may be embodied as a flow diagram. FIG. 9 is a flow diagram of one embodiment of a method for determining a task for a particular PE to be performed. The method 900 may be implemented by the particular PE and/or by a dedicated scheduling process implemented by another processing element (e.g., by another PE, a GPE, or the like).

At step 910, the method 900 may be initialized, which may comprise loading one or more computer-readable instructions from a computer-readable storage medium, accessing one or more communications interfaces, accessing resources of a single-chip multiprocessor, and so on. The instructions comprising the method 900 may be embodied as one or more distinct software modules stored on a computer-readable storage medium (e.g., disc, optical storage media, file system, network attached storage, or the like). Certain of the instructions and/or steps of the method 900 may be implemented as hardware components, such as digital logic components, analog circuits, or the like. Moreover, one or more of the instructions may be adapted to interface with particular hardware components, such as communications interfaces, processing elements, or the like. Therefore, one or more of the steps of the method 900 may comprise and/or be tied to particular machine components.

In addition, at step 910, the initialization may comprise creating a job queue comprising a set of video frame encoding tasks. The job queue may comprise the first, second, and third pipeline stages described above, macroblock encoding, deblocking filtering, and entropy encoding (e.g., CABAC). Accordingly, the initialization of step 910 may comprise partitioning a video frame into a plurality of macroblock partitions (vertically, diagonally, or the like), each macroblock partition comprising a set of macroblocks (e.g., organized as single macroblocks, 4×4 macroblock sets, slabs, or the like). Each of the first and the second queues may comprise queues for each of the partitions (e.g., the first, macroblock encoding queue may include a set of queues, each queue corresponding to a different macroblock partition).

At step 920, a task for a particular PE may be selected. Step 920 may be implemented whenever a PE of the single-chip multiprocessor becomes idle.

At step 930, the method 900 may determine whether the first job queue (comprising macroblock encoding tasks) includes any pending jobs. The unit of the queue may be the skewed vertical macroblock partition associated with the PE (e.g., the macroblock partition assigned to the PE per FIGS. 5-8). If a pending job is available, the flow may continue to step 935; otherwise, the flow may continue to step 940.

At step 935, the selected encoding job may be popped from the queue and performed by the PE. After completing the encoding job, the flow may return to step 920, where a next task for the PE may be selected.

At step 940, the method 900 may determine whether the second job queue (comprising deblocking filtering tasks) includes any pending jobs. The unit of the job queue may be the skewed vertical macroblock partition associated with the PE. If a pending job is available, the flow may continue to step 945; otherwise, the flow may continue to step 950.

At step 945, the selected filtering job may be popped from the queue and performed by the PE. After completing the filtering job, the flow may return to step 920, where a next task for the PE may be selected.

At step 950, the third queue may be examined to determine whether an entropy coding job is available. As discussed above, entropy coding may be implemented on a single PE. Accordingly, the third, entropy encoding queue, may include only a single entry. If the entropy encoding task is available, the flow may continue to step 955; otherwise, the flow may terminate at step 960 until a next frame is ready for processing.

At step 955, the entropy coding job may be popped from the third queue. The SPU may then implement the entropy coding task. After completion of the task, the flow may terminate at step 960 until a next frame is ready for processing.

As described above, the encoding, filtering, and entropy coding tasks performed during frame processing may include inter-macroblock dependencies, such as inter-macroblock motion estimation dependencies, deblocking filtering, and the like. The processing workflow of the method 900 may be adapted to account for these dependencies. In some embodiments, the partitioning and job queue creation at step 910 may be adapted to minimize dependencies between PEs. For example, a diagonal partitioning may be performed to reduce the motion estimation dependencies and/or block filtering between adjacent blocks (e.g., as illustrated in FIGS. 7 and 8). In addition, workflow scheduling may be implemented to schedule processing to avoid deadlocking. For example, a first macroblock partition may comprise macroblocks that are to the "right" and/or "above" the macroblocks of a second partition. The first and the second macroblock partitions may be adjacent to one another in the frame. The scheduling of step 910 may, therefore, schedule the first macroblock to be processed before the second macroblock (one after the other), such that the dependencies of the macroblocks in the second partition will be satisfied at processing time. Similarly, where vertical partitioning is used, the partitions may be configured to be processed simultaneously and/or in a staggered fashion (e.g., per FIGS. 4A-4C) such that cross-dependencies therebetween may be satisfied.

As discussed above, information relating to the macroblocks on the borders of different macroblock partitions may be shared between SPUs. For instance, in motion estimation, motion information of the macroblocks above, behind (to the right), and diagonally (to the left and above) may be used during motion estimation. As such, in embodiments using vertical partitioning between PEs, bidirectional data flow between PEs processing adjacent macroblock partitions may be required (e.g., as illustrated in FIG. 6). In embodiments using diagonal partitioning, unidirectional data flow may be used (e.g., as illustrated in FIG. 7). Other types of dependencies may exist. For example, for intra-macro block motion predictions 16 pixels in the right-most column on the right-side border macroblock (32 bytes, 16Y+8U+8V) and 16 pixels on the bottom row on the bottom side of the border macroblock (32 byes, 16Y, 8U, 8V) may be needed. For inter-macroblock prediction, including sub-macroblock partitions, different data may be needed (e.g., motion vector for each partition, such as a maximum or average motion vector, a reference index, a reference direction, and the like).

In some embodiments, communications features of the single-chip multiprocessor upon which the video encoding is implemented may be leveraged to enhance inter-PE communications (e.g., to satisfy the dependencies discussed above). For example, the PEs may share a common memory cache storage location. One of the PEs may be selected to monitor the cache to detect changes therein. Upon detection of a cache update, the monitoring PE may determine whether the cache update includes data that may be required by another PE (e.g., data relating to a border macroblock, or the like). The monitoring PE may then facilitate transferring the relevant data to the other PE.

Figure 10:
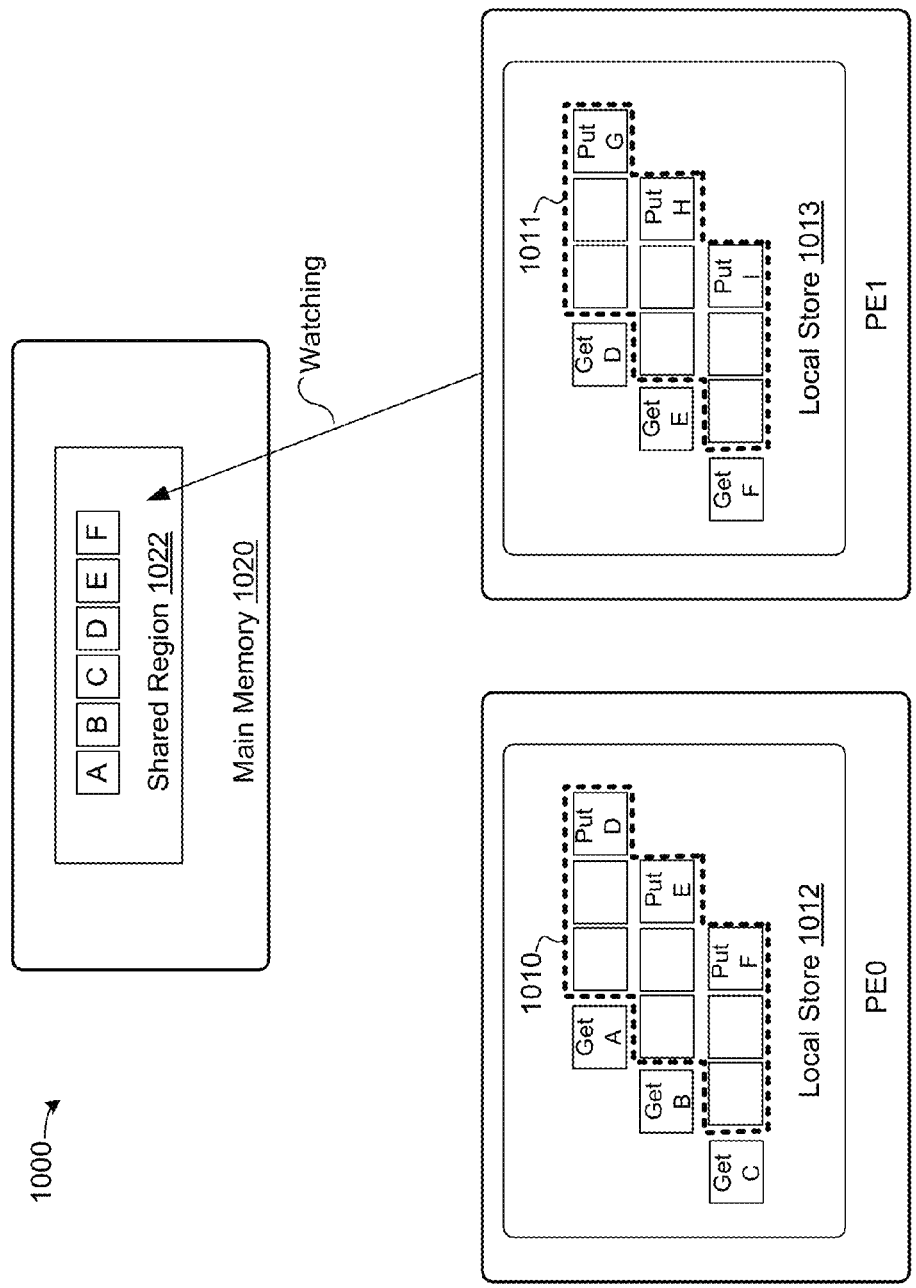
FIG. 10 illustrates the transfer of information regarding boundary macroblocks between processing elements.

In one example, a particular PE (PE1) may be configured to monitor a region shared by other PEs. In some embodiments, the particular PE of the single-chip multiprocessor may have a mechanism for fast detection of cache updates. When one of the PEs updates the shared region, the monitoring PE (PE1) may detect the update and obtain one or more related macroblocks (upon which the PE may depend) from a main memory. One example of this interaction is illustrated in FIG. 10. In the block diagram 1000 of FIG. 10, PE0 and PE1 are operating within a shared region (e.g., processing adjacent macroblock partitions 1010 and 1011). The partition 1010 of PE0 may include macroblocks D, E, and F, which are needed by the PE1 to process the macroblock partition 1011. When PE0 processes the macroblocks D, E, and F (e.g., calculates motion estimates, etc.), PE0 may update the shared region 1022 in the main memory 1020. PE1, which needs the macroblocks D, E, and F (to processes the macroblock partition 1010), may be watching the shared region 1022 for updates. When updates are detected, PE1 may use the updated data to process the partition 1011 (e.g., calculate motion estimates, etc.). Similarly, PE0 (or some other PE, such as PE1) may be configured to watch the shared region 1022 for updates to macroblocks A, B, and/or C, which may be needed for processing the partition 1012, and another PE (not shown) may monitor the shared region 1022 for updates to the macroblocks G, H, and I produced by PE1.

In some embodiments, information relating to border macroblocks may be transferred between PEs (e.g., from PE0 to PE1) using a transport mechanism provided by the single-chip multiprocessor. In the STI CELL example, an "atomic update" synchronization method may be used to efficiently transfer information between PEs. However, the disclosure is not limited in this regard, and other single-chip multiprocessor data transformer mechanisms could be used under the teachings of this disclosure. In the atomic update example, a PE may issue a PE event, which may comprise a Lock-line reservation lost event (LLRLOST event). MFC atomic update commands may include, an MFC get lock-line reservation command (CETLLAR), PE interrupt commands (e.g., commands to clear PE events, get a lock-line reservation, wait, acknowledge, etc.), and the like.

In some embodiments, a single-chip multiprocessor may provide for inter-PE messaging. The STI Cell architecture allows messages to be sent between PEs using "PE mailboxes." A PE may send messages to another PE's inbound mailbox. The recipient PE may access messages in its mailbox in first-in-first-out (FIFO) order (or other queuing mechanism). The mailbox communications system may be used to communicate and/or synchronize border macroblock information (e.g., motion vectors, filtering information, etc.). When mailbox messaging is used, each PE may be configured to know which PE(s) are dependent upon the macroblocks processed thereby (e.g., may be configured to know which PE is processing the macroblock partition(s) that are adjacent to the PE's macroblock partition). Updates to bordering macroblocks may then be sent to the proper PE mailboxes.

As discussed above, macroblock encoding may comprise a number of different operations, including, but not limited to: motion estimation, motion compensation, transformations (DCT, iDCT), quantization, de-quantization, filtering, and the like (e.g., processes 222, 224, 226, 228, 230, 232, and 234 of FIG. 2). These macroblock sub-functions may be implemented on a macroblock partition basis (e.g., may be performed serially across a macroblock partition) and/or within subsets of a macroblock partition (e.g., within macroblock slabs). Where macroblock slabs are processed, slab synchronization may be performed after various operations. For example, after motion estimates for a macroblock slab are calculated, inter-macroblock slab synchronization may be performed. Similarly, after motion compensation processing is completed, buffers reference data (used by other processing steps) may be released.

Figure 11:
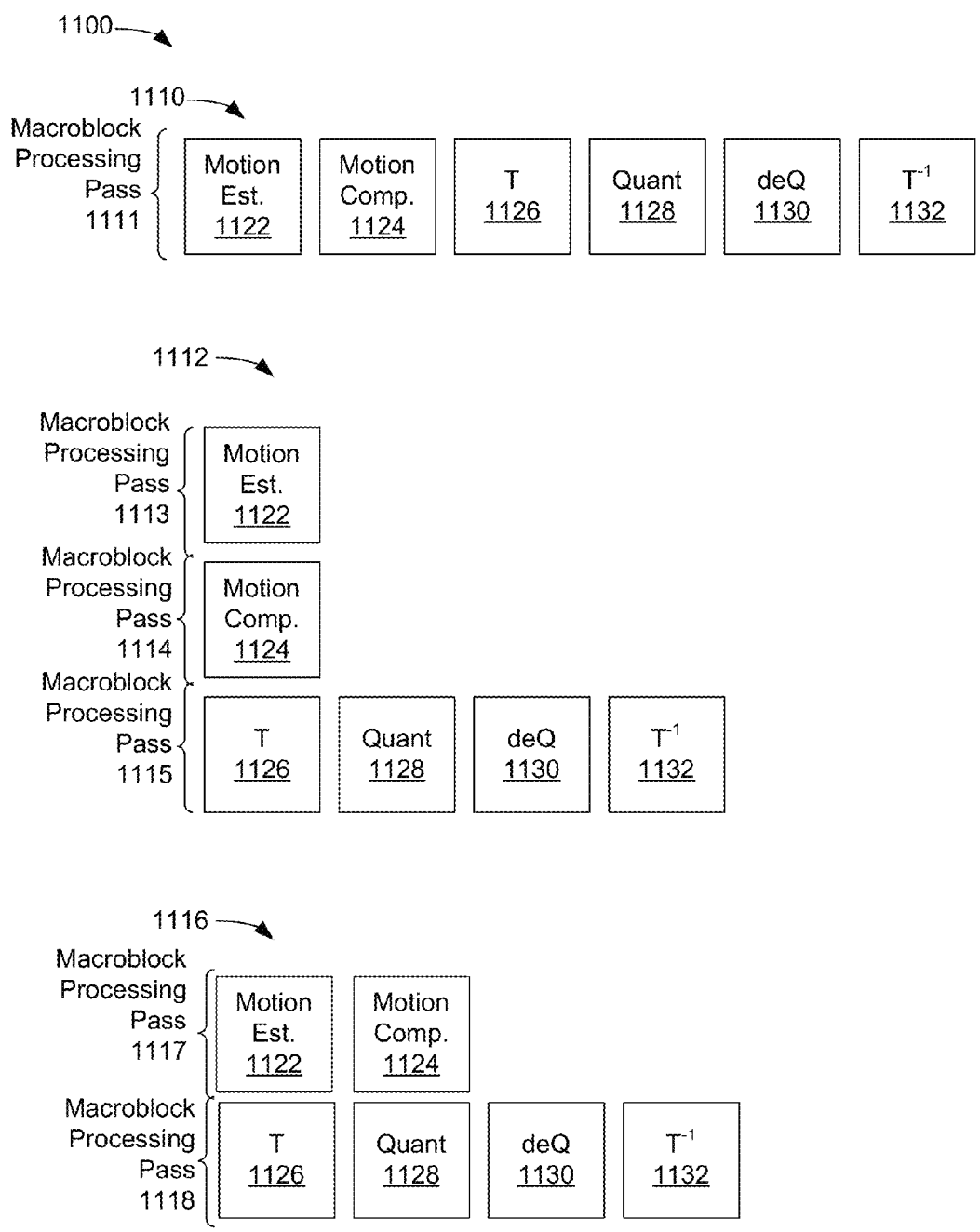
FIG. 11 shows examples of encoding processing patterns.

FIG. 11 shows examples of various different sub-function ordering techniques 1100 that could be implemented within a PE under the teachings of this disclosure. In pattern 1110, motion estimation 1122, motion compensation 1124, transform (DCT) 1124, quantization 1126, de-quantization 1128, and inverse transform 1130 may each be performed within the same processing pass. Accordingly, each macroblock in the partition may be processed by 1122, 1124, 1126, 1128, and 1130 before a next macroblock is processed.

The pattern 1112 may include three processing passes 1113, 1114, and 1115. In the processing pass 1113, each macroblock in the partition may be processed for motion estimation 1122. In the next processing pass 1114, the macroblocks may be processed for motion compensation 1124. In the processing pass 1115, the macroblocks may be transformed 1126, quantized 1128, de-quantized 1130, and inverse transformed 1130.

The pattern 1116 may include two processing passes 1117 and 1118. In the processing pass 1117, each of the macroblocks in the partition may be processed for motion estimation 1122 and motion compensation 1124. In the second processing pass 1118 the macroblocks may be transformed 1126, quantized 1128, de-quantized 1130, and inverse transformed 1132.

In some embodiments, motion estimation using e.g., FastVDO, may comprise referencing video data from backwards and/or forwards frames. For example, in inter prediction for a P-Frame or slice, motion estimation references a backwards frame (e.g., minus one frame in the L0 direction). A P-frame or slice bi-directional search may include minus one frame in the L0 direction and one frame in the L1 direction. Motion estimation may be unpredictable since the encoder may be required to search a similar macroblock of the reference frame in a "random" walk search. Some implementations (e.g., FastVDO) may provide for a full-Pel search (e.g., Diamond search) and/or a Sub-Pel search (e.g., Hexagonal search). The searches may reference motion vectors of neighboring macroblocks.

In FastVDO, motion vectors of neighboring macroblocks may be used to determine the initial position of a motion search. Accordingly, fastVDO motion estimation may comprise prefetching a reference window (within an appropriate range as determined by neighboring macroblocks). In a single-chip multiprocessor architecture, a PE may be configured to issue a DMA request to prefetch the appropriate frames. For example, a reference window may include a 9×7 macroblock window. During prefetching, a double buffered DMA transfer may be implemented to cover the whole reference window area of each macroblock slab.

Figure 12:
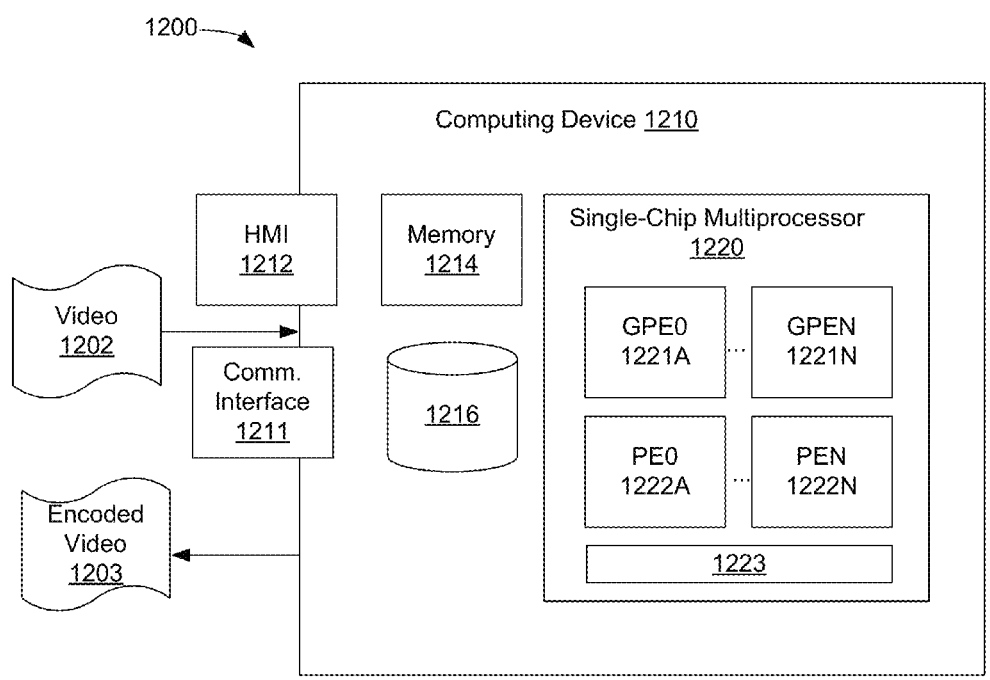
FIG. 12 is a block diagram of one example of a system for encoding video using a single-chip multiprocessor.

FIG. 12 is a block diagram of one embodiment of a system 1200 for encoding video using a single-chip multiprocessor. The system 1200 may include a computing device 1210, which may include a communications interface 1211, a human-machine interface (HMI) 1212, a memory 1214, a computer-readable storage medium 1216, and a single-chip multiprocessor 1220. The communications interfaced 1211 may provide for communicatively coupling the computing device 1210 to one or more communications networks (not shown), such as TCP/IP networks, Local Area Networks (LANs), Wide Area Networks (WANs), wireless networks, WiFi networks or the like. The HMI 1212 may include one or more display devices (e.g., monitors, printers, and the like), input/output devices (e.g., mouse, keyboard, and the like), and other devices to allow a human operator to interact with and/or operate the computing device 1210.

The computing device may include a memory 1214, which may comprise system memory, volatile and/or non-volatile storage, shared memory, or the like. A computer-readable media 1216 may provide persistent storage, and may comprise one or more hard discs, optical media, Flash memory, or the like.

The single-chip multiprocessor 1220 may include one or more general purpose elements (GPE) 1221A-1221N and/or one or more processing elements and/or special purpose processing elements (PE) 1222A-1222N. The GPEs 1221A-1221N and PEs 1222A-1222N may be used to encode video 1202. The single-chip multiprocessor 1220 may include shared memory storage 1223, which may provide for communications between the GPEs 1221A-1221N and/or the PEs 1222A-1222N. Although not depicted in FIG. 12, each of the GPEs 1221A-1221N and/or the PEs 1222A-1222N may further include local storage (e.g., local cache), communications storage (e.g., mailbox storage), and the like.

The computer-readable storage media 1216 may include computer-readable instructions adapted for execution on the single-chip multiprocessor 1220. The instructions may be configured to cause the single-chip multiprocessor 1220 to encode video content 1202 as described herein.

Video 1202 for encoding may be received via the communications interface 1211 and/or HMI 1212. The video 1202 may be stored on the memory 1214 and/or the computer-readable storage medium 1216, which may be accessible by the single-chip multiprocessor 1220. The encoded video 1203 may be stored on the memory 1214, computer-readable storage media 1216, and/or presented on a display of the HMI 1212.

The above description provides numerous specific details for a thorough understanding of the embodiments described herein. However, those of skill in the art will recognize that one or more of the specific details may be omitted, or other methods, components, or materials may be used. In some cases, operations are not shown or described in detail.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable medium having stored instructions thereon that may be used to program a computer (or other electronic device) to perform processes described herein. The computer-readable medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be understood by those having skill in the art that many changes may be made to the details of the above-described embodiments without departing from the underlying principles of the disclosure.

We claim:

1. A non-transitory computer-readable storage medium comprising instructions configured to cause a computing device to perform a method for encoding video frames, the method comprising:
   determining a partition configuration for the video frames based on macroblock processing dependencies, wherein the determined partition configuration is adapted to reduce macroblock processing dependencies between respective partitions;
   processing one or more video frames by use of a plurality of processing elements, wherein each processing element is configured to process frame macroblocks, and wherein processing a video frame comprises,
      partitioning the video frame into a plurality of partitions in accordance with the determined partition configuration, each partition comprising a plurality of macroblocks,
      identifying inter-macroblock motion-vector dependencies between the macroblocks in the partitions,
      assigning each of the partitions of the video frame to a respective processing element of the plurality of processing elements,
      identifying inter-processing element motion-vector dependencies between the plurality of processing elements processing macroblocks of the video frame based on the partition assignments,
      in each of the processing elements, staggering motion-estimation processing of the macroblocks in partitions assigned to the processing element to maintain the identified inter-macroblock motion-vector dependencies, and
      staggering processing of the partitions by the plurality of processing elements to maintain the identified inter-processing element motion-vector dependencies.

2. The non-transitory computer-readable storage medium of claim 1, wherein partitioning the video frame comprises partitioning the video frame diagonally.

3. The non-transitory computer-readable storage medium of claim 1, further comprising assigning one or more partitions to each of eight processing elements of a single-chip multiprocessor.

4. The non-transitory computer-readable storage medium of claim 1, further comprising communicating data corresponding to inter-processing element motion-vector dependencies between processing elements.

5. The non-transitory computer-readable storage medium of claim 4, wherein the data corresponding to the inter-processing element motion-vector dependencies comprises macroblock motion estimates.

6. The non-transitory computer-readable storage medium of claim 1, further comprising communicating macroblock motion estimates between processing elements by use of a processing-element mailbox.

7. The non-transitory computer-readable storage medium of claim 1, further comprising communicating macroblock motion estimates between processing elements by use of a shared memory.

8. The non-transitory computer-readable storage medium of claim 1, further comprising assigning one or more new partitions to a processing element in response to the processing element completing processing of one or more partitions assigned to the processing element.

9. An apparatus for encoding a video frame, comprising:
   a general purpose processing element; and
   a plurality of processing elements communicatively coupled to the general purpose processing element,
   wherein the general purpose processing element is configured to:
      determine a partition configuration for video frames based on macroblock processing dependencies, wherein the determined partition configuration is adapted to reduce macroblock processing dependencies between respective partitions,
      partition a video frame comprising a plurality of macroblocks into a plurality of partitions in accordance with the determined partition configuration, each partition comprising a plurality of the macroblocks,
      assign each of the partitions of the video frame to a respective one of the plurality of processing elements based on inter-macroblock motion-vector dependencies between the macroblocks of the video frame,
      identify motion-vector processing element dependencies between the processing elements assigned macroblocks of the video frame based on the partition assignments and the inter-macroblock motion-vector dependencies, and
      configure each of the processing elements to stagger processing of the partitions assigned to the processing element to satisfy the motion-vector processing element dependencies, and to stagger processing of the macroblocks in the assigned partitions to satisfy the inter-macroblock motion-vector dependencies.

10. The apparatus of claim 9, wherein the general purpose processor is configured to partition the video frame into a plurality of diagonal partitions.

11. The apparatus of claim 9, further comprising shared memory storage, wherein the processing elements are configured to communicate data pertaining to the motion-vector processing element dependencies by use of the shared memory.

12. The apparatus of claim 11, wherein the processing elements are configured to store macroblock motion estimates in the shared memory storage.

13. The apparatus of claim 9, further comprising a processing element mailbox, wherein the processing elements are configured to communicate data corresponding to motion-vector processing element dependencies by use of the mailbox.

14. The apparatus of claim 13, wherein the processing elements are configured to communicate macroblock motion estimates by use of the mailbox.

15. The apparatus of claim 9, wherein the general purpose processing element is configured to partition the video frame to minimize inter-macroblock dependencies.

* * * * *